United States Patent
Busser

(10) Patent No.: US 9,573,508 B2
(45) Date of Patent: Feb. 21, 2017

(54) VEHICLE DUMPING BED CLEANING DEVICE

(71) Applicant: Monte Busser, Colton, SD (US)

(72) Inventor: Monte Busser, Colton, SD (US)

( * ) Notice: Subject to any disclaimer, the term of this patent is extended or adjusted under 35 U.S.C. 154(b) by 0 days.

(21) Appl. No.: 14/712,023

(22) Filed: May 14, 2015

(65) Prior Publication Data

US 2016/0332602 A1 Nov. 17, 2016

(51) Int. Cl.
*B60P 1/04* (2006.01)

(52) U.S. Cl.
CPC ........................................ *B60P 1/04* (2013.01)

(58) Field of Classification Search
CPC ....................................................... B60P 1/04
USPC .......... 298/1 B; 414/492, 493, 514, 516, 517, 414/521, 585; 100/218
See application file for complete search history.

(56) References Cited

U.S. PATENT DOCUMENTS

| | | | |
|---|---|---|---|
| 3,050,203 A | 8/1962 | De Biasi | |
| 3,682,336 A | 8/1972 | Wieschel et al. | |
| 3,749,261 A | 7/1973 | Herpich et al. | |
| 3,819,071 A | 6/1974 | Liberman | |
| 3,827,753 A * | 8/1974 | Pitts | B60P 1/006 298/1 B |
| 3,899,091 A | 8/1975 | Smith | |
| 5,228,750 A | 7/1993 | Hagenbuch | |
| 6,176,673 B1 | 1/2001 | Moyna et al. | |
| 6,672,822 B1 | 1/2004 | Moyna | |
| 7,118,320 B2 | 10/2006 | Tomassoni | |

FOREIGN PATENT DOCUMENTS

JP  2006213217  8/2006

\* cited by examiner

*Primary Examiner* — Stephen Gordon

(57) ABSTRACT

A vehicle dumping bed cleaning device for scraping the interior surface of a dumping bed of a vehicle to facilitate removal of dirt and debris from the dumping bed includes a vehicle having a dumping bed defining an interior space between parallel spaced walls and a bottom surface extending between the walls. Each of a pair of elongated lateral arms is pivotally coupled to an associated one of the walls of the dumping bed. A scraper is coupled to and extends between the lateral arms. The scraper abuts the bottom surface of the dumping bed as the lateral arms are pivoted for scraping debris from the bottom surface of the dumping bed. A motor is coupled to the lateral arms to pivot the lateral arms whereby the scraper is moved on the bottom surface of the dumping bed.

17 Claims, 5 Drawing Sheets

VEHICLE DUMPING BED CLEANING DEVICE

BACKGROUND OF THE DISCLOSURE

Field of the Disclosure

The disclosure relates to cleaning devices and more particularly pertains to a new cleaning device for scraping the interior surface of a dumping bed of a vehicle to facilitate removal of dirt and debris from the dumping bed.

SUMMARY OF THE DISCLOSURE

An embodiment of the disclosure meets the needs presented above by generally comprising a vehicle having a dumping bed defining an interior space between parallel spaced walls and a bottom surface extending between the walls. Each of a pair of elongated lateral arms is pivotally coupled to an associated one of the walls of the dumping bed. A scraper is coupled to and extends between the lateral arms. The scraper abuts the bottom surface of the dumping bed as the lateral arms are pivoted for scraping debris from the bottom surface of the dumping bed. A motor is coupled to the lateral arms to pivot the lateral arms whereby the scraper is moved on the bottom surface of the dumping bed.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
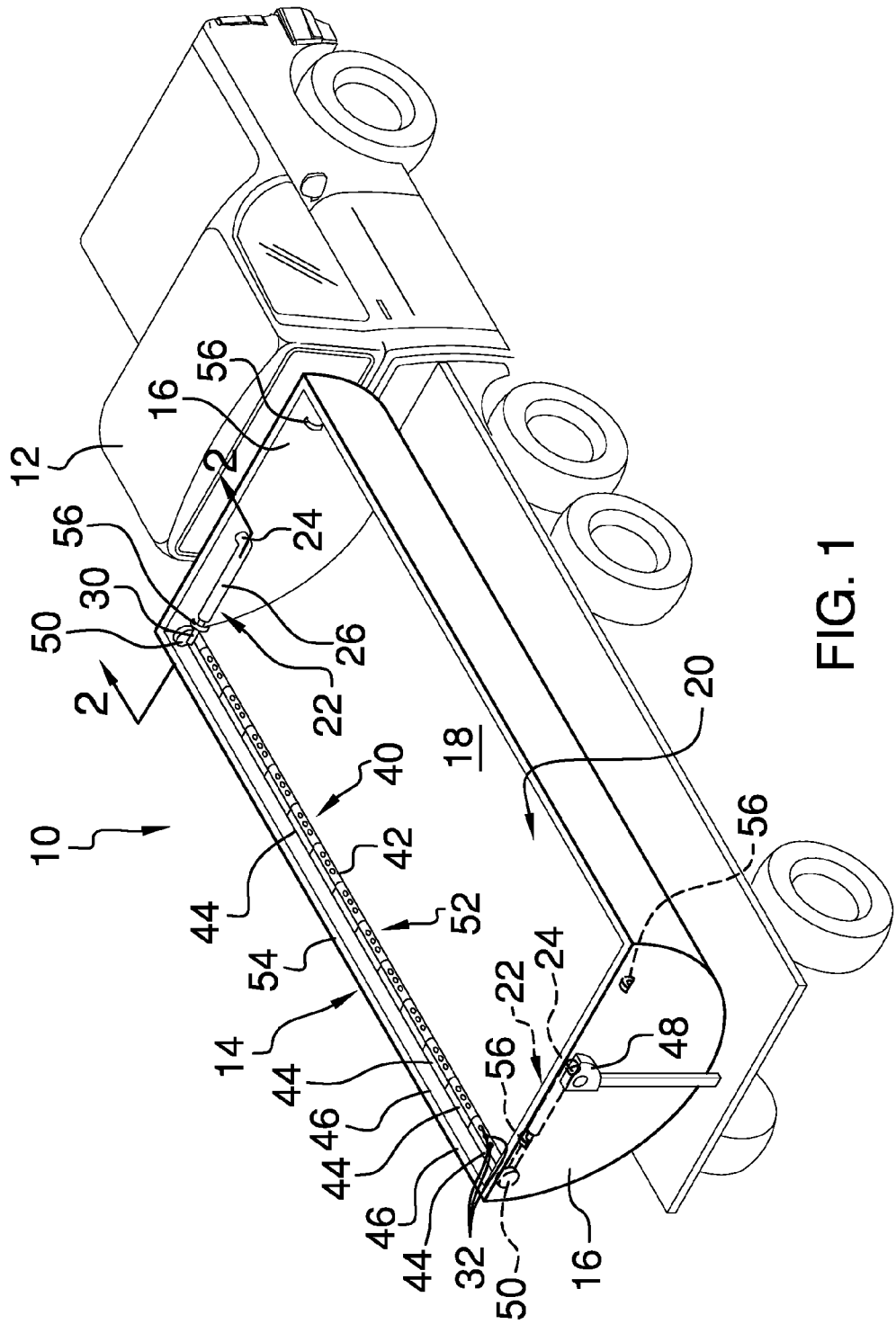
FIG. 1 is a top back side perspective view of a vehicle dumping bed cleaning device according to an embodiment of the disclosure.
Figure 2:
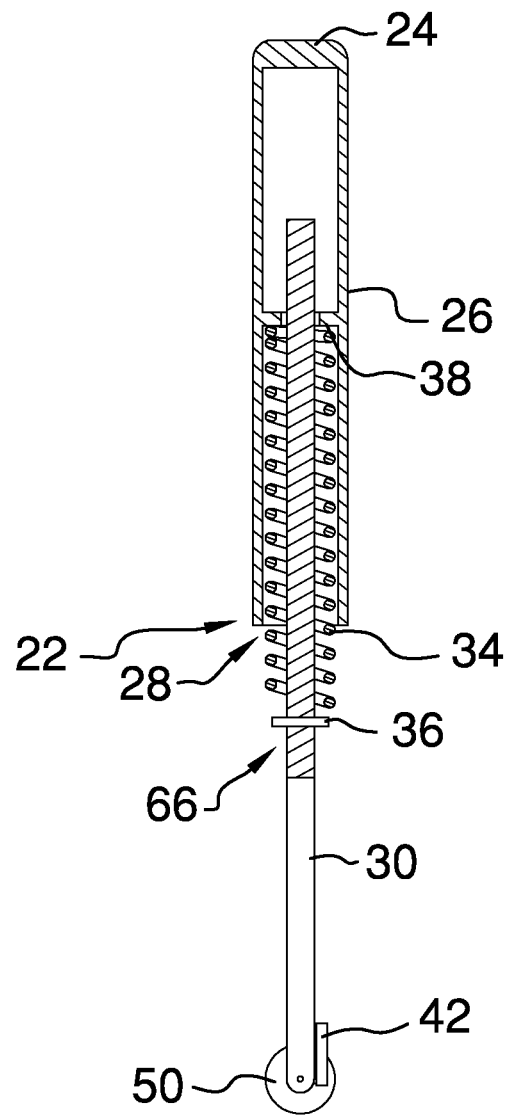
FIG. 2 is a cross-sectional view of an embodiment of the disclosure taken along line 2-2 of FIG. 1.
Figure 3:
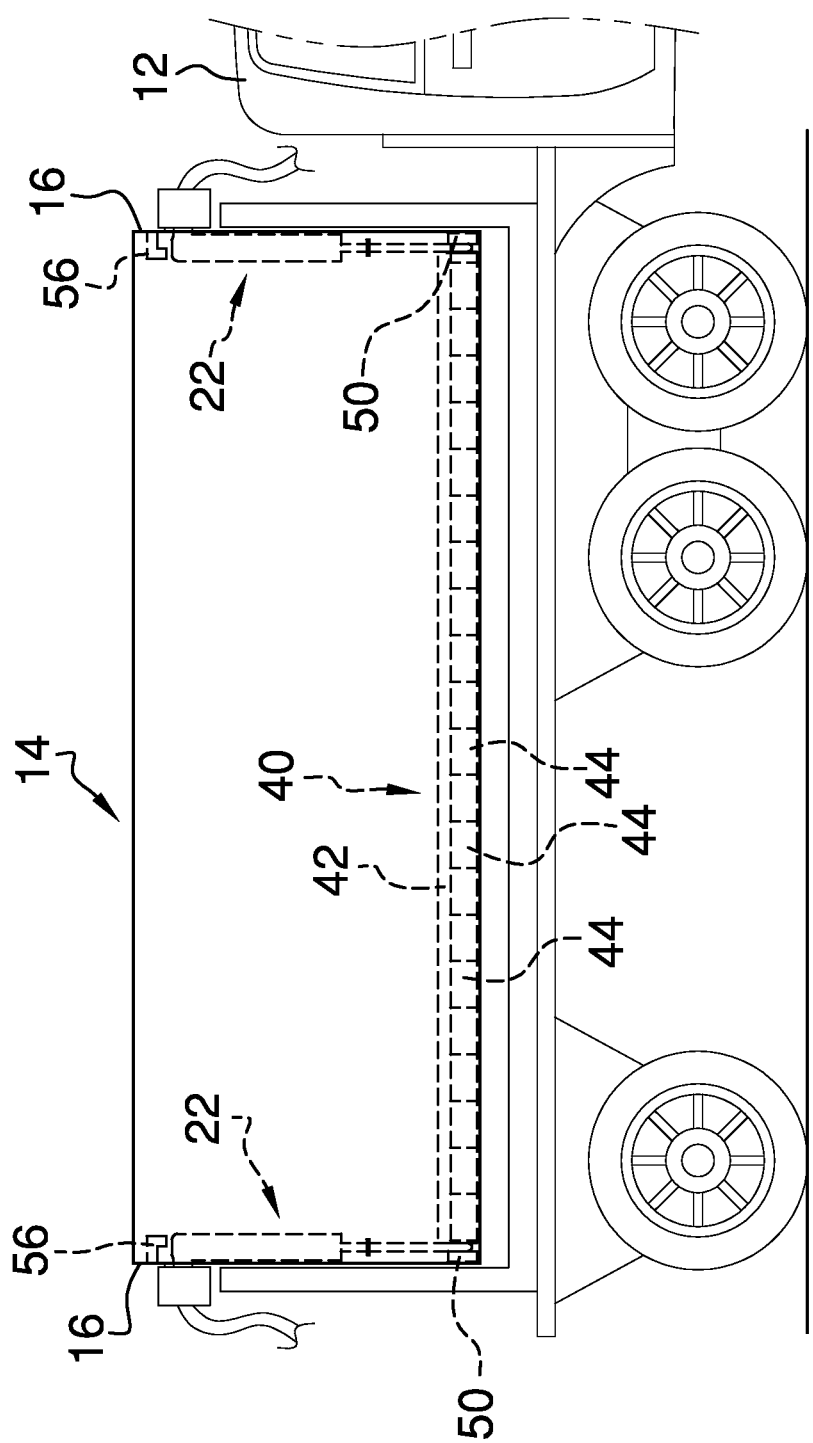
FIG. 3 is a side view of an embodiment of the disclosure having a side dumping vehicle.
Figure 4:
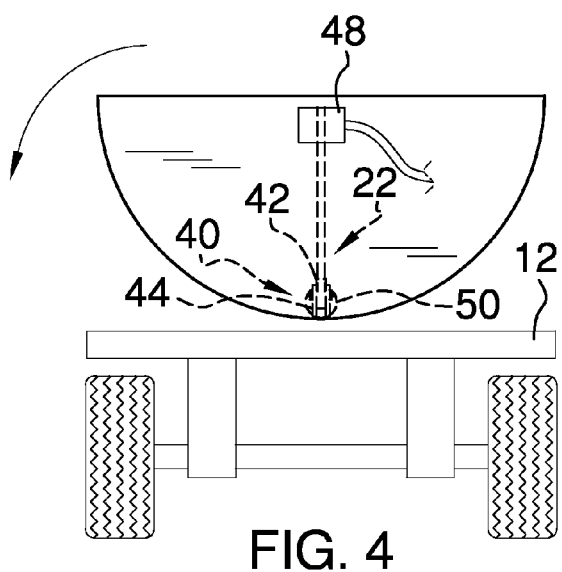
FIG. 4 is a side view of an embodiment of the disclosure having a rear dumping vehicle.
Figure 5:
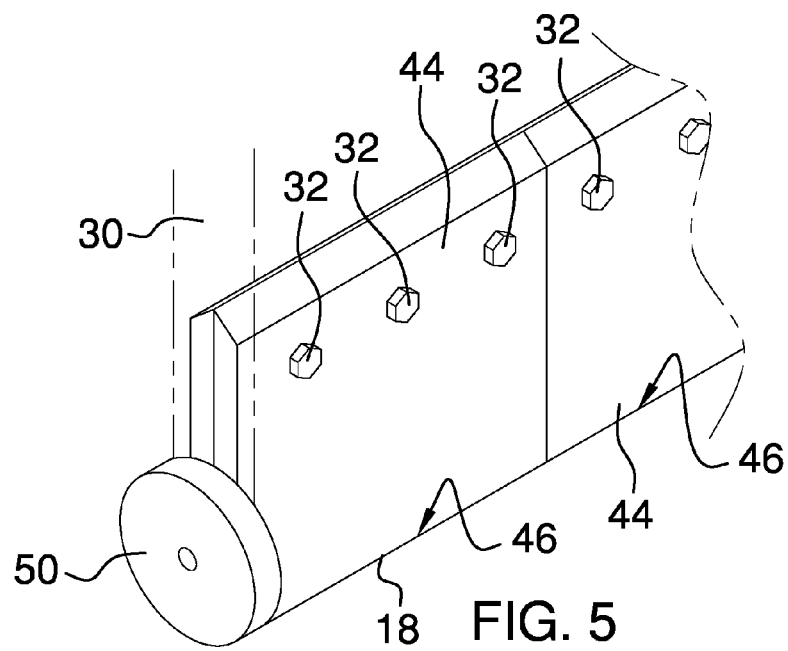
FIG. 5 is a detailed view of a portion of a scraper of an embodiment of the disclosure.

With reference now to the drawings, and in particular to FIGS. 1 through 6 thereof, a new cleaning device embodying the principles and concepts of an embodiment of the disclosure and generally designated by the reference numeral 10 will be described.

As best illustrated in FIGS. 1 through 6, the vehicle dumping bed cleaning device 10 generally comprises a vehicle 12 having a dumping bed 14. The dumping bed 14 is pivotable relative to the vehicle 12 in a conventional manner. The dumping bed 14 is pivotable on an axis parallel to a longitudinal axis of the vehicle 12 as in a side dump truck. Alternatively, the dumping bed 14 is pivotable on an axis transverse to a longitudinal axis of the vehicle 12 as in a conventional rear dump truck. Generic to either type of vehicle 12, the dumping bed 14 has a pair of walls 16. The walls 16 are spaced apart and parallel. The dumping bed 14 further has a bottom surface 18 extending between the walls 16. The bottom surface 18 is generally arcuate and may be arcuate having a consistent radius from a center of rotation. The walls 16 and the bottom surface 18 define an interior space 20 of the dumping bed 14 used to haul dirt, debris, snow, work materials, or various other objects.

Each of a pair of lateral arms 22 is pivotally coupled to an associated one of the walls 16 of the dumping bed 14. Each of the lateral arms 22 is elongated and parallel to the associated wall 16 of the dumping bed 14. Each of the lateral arms 22 has a first end 24 pivotally coupled to the associated wall 16 of the dumping bed 14. Each lateral arm 22 includes a sleeve 26 having an open end 28. A rod 30 is slidably inserted into the open end 28 of the sleeve 26. The rod 30 is threaded. A biasing member 34 is coupled to the rod 30 and the sleeve 26 such that the biasing member 34 urges the rod 30 outwardly relative to the open end 28 of the sleeve 26. Thus, each lateral arm 22 is resiliently biased to resist compression while being compressible relative to a length of the lateral arm 22. A stop 36 is threadedly engaged to the rod 30 wherein the stop 36 is adjustably positionable on the rod 30. The stop 36 may be secured to a desired position along the rod 30 in a conventional manner. The biasing member 34 is compressed between a lip 38 positioned within the sleeve 26 and the stop 36. Thus, tension in the biasing member 34 is adjustable by adjusting a position of the stop 36 on the rod 30.

Figure 6:
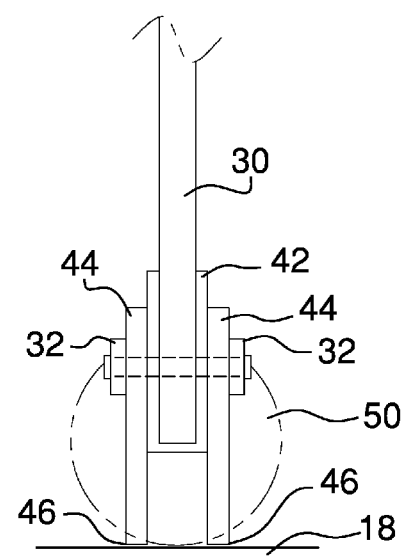
FIG. 6 is a detailed end view of a scraper of an embodiment of the disclosure.

A scraper 40 is coupled to and extends between the lateral arms 22. The scraper 40 is positioned to abut the bottom surface 18 of the dumping bed 14 such that the scraper 40 maintains contact with the bottom surface 18 of the dumping bed 14 as the lateral arms 22 are pivoted. Thus, the scraper 40 is configured for scraping debris from the bottom surface 18 of the dumping bed 14. The scraper 40 is moved in line with a direction in which the dumping bed 14 is pivoted to dump material from the dumping bed 14. The lateral arms 22 may be pivoted in combination with pivoting of the dumping bed 14 such that the scraper 40 pushes matter out of the interior space 20 of the dumping bed 14. The scraper 40 includes an elongated base 42 coupled to and extending between the lateral arms 22. Each of a plurality of blades 44 is coupled to the base 42. Each of the blades 44 extends outwardly from the base 42 wherein a distal edge 46 of each blade 44 relative to the base 42 abuts the bottom surface 18 of the dumping bed 14. The blades 44 are linearly aligned along a full length of the base 42. Each blade 44 abuts each adjacently positioned the blade 44 along the base 42 wherein the blades 44 extend continuously along the base 42 of the scraper 40. Each of a plurality of connectors 32 is used to removably couple an associated one of the blades 44 to the base 42 wherein each of the blades 44 is individually replaceable. Each blade 44 is coupled to the base 42 by at least three of the connectors 32. Each connector 32 may be a bolt or similar fastener. Each blade 44 may be constructed of plastic, metal, or the like. Each blade 44 may have a length between 5 and 100 centimeters. As seen in FIG. 6, two rows 68 of blades 44 may be provided. Each row 68 being on a respective side of the base 42. The connector 32 extends through the base 42 and the spaced pair of blades 44 seen in FIG. 6.

A motor 48 is coupled to the lateral arms 22 wherein the motor 48 urges the lateral arms 22 to pivot within the interior space 20 of the dumping bed 14. Thus, the scraper 40 is moved on the bottom surface 18 of the dumping bed 14. The lateral arms 22 may be hydraulically coupled to the motor 48 which may be a hydraulic system of the vehicle 12. The motor 48 may comprise one or more individual electric motors or engines dedicated to coordinated pivoting of the lateral arms 22.

Each of a pair of wheels 50 is coupled to an associated one of the lateral arms 22. Each wheel 50 is positioned to abut and roll along the bottom surface 18 of the dumping bed 14 as the lateral arms 22 are pivoted.

The lateral arms 22 are pivotable between a retracted position 52 wherein the lateral arms 22 are positioned proximate an edge 54 of the bottom surface 18 such that the lateral arms 22 and scraper 40 do not interfere with filling the dumping bed 14. Seats 56 are coupled to the dumping bed 14 to receive the lateral arms 22 preventing the lateral arms 22 from extending out of the dumping bed 14. The seats 56 may be positioned on opposite sides of the walls 16 to define a full range of motion for the lateral arms 22 within the dumping bed 14.

In use, the dumping bed 14 is used in a conventional manner. Each of the lateral arms 22 is adjusted as described above to provide desired tension against compression and abutment of the scraper 40 against the bottom surface 18 of the dumping bed 14 during use. When desired, the lateral arms 22 are moved to urge the scraper 40 across the bottom surface 18 of the dumping bed 14 to remove dirt, debris, or the like. Movement of the lateral arms 22 may be performed in combination with the conventional dumping movement of the dumping bed 14 to expel scraped dirt and debris from the dumping bed 14. As needed, individual blades 44 of the scraper 40 may be replaced.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A vehicle dumping bed cleaning device comprising:
   a vehicle having a dumping bed, said dumping bed having a pair of walls, said walls being spaced apart and parallel, said dumping bed having a bottom surface extending between said walls, said walls and said bottom surface defining an interior space of said dumping bed;
   a pair of lateral arms, each of said lateral arms being pivotally coupled to an associated one of said walls of said dumping bed, each of said lateral arms being elongated;
   a scraper coupled to and extending between said lateral arms, said scraper being positioned to abut said bottom surface of said dumping bed as said lateral arms are pivoted wherein said scraper is configured for scraping debris from said bottom surface of said dumping bed;
   a motor coupled to said lateral arms wherein said motor urges said lateral arms to pivot whereby said scraper is moved on said bottom surface of said dumping bed; and
   a pair of wheels, each of said wheels being coupled to an associated one of said lateral arms, each said wheel being positioned to abut and roll along said bottom surface of said dumping bed as said lateral arms are pivoted.

2. The device of claim 1, further comprising said scraper being moved in line with a direction in which said dumping bed is pivoted to dump material from said dumping bed.

3. The device of claim 1, further comprising said lateral arms being hydraulically coupled to said motor.

4. The device of claim 1, further comprising each of said lateral arms having a first end pivotally coupled to said associated wall of said dumping bed.

5. A vehicle dumping bed cleaning device comprising:
   a vehicle having a dumping bed, said dumping bed having a pair of walls, said walls being spaced apart and parallel, said dumping bed having a bottom surface extending between said walls, said walls and said bottom surface defining an interior space of said dumping bed;
   a pair of lateral arms, each of said lateral arms being pivotally coupled to an associated one of said walls of said dumping bed, each of said lateral arms being elongated;
   a scraper coupled to and extending between said lateral arms, said scraper being positioned to abut said bottom surface of said dumping bed as said lateral arms are pivoted wherein said scraper is configured for scraping debris from said bottom surface of said dumping bed;
   a motor coupled to said lateral arms wherein said motor urges said lateral arms to pivot whereby said scraper is moved on said bottom surface of said dumping bed;
   each of said lateral arms being compressible relative to a length of said lateral arm; and
   each said lateral arm being resiliently biased to resist compression such that said scraper maintains contact with said bottom surface of said dumping bed as said lateral arms are pivoted.

6. The device of claim 5, wherein said each said lateral arm comprises:
   a sleeve having an open end;
   a rod slidably inserted into said open end of said sleeve; and
   a biasing member coupled to said rod and said sleeve such that said biasing member urges said rod outwardly relative to said open end of said sleeve.

7. The device of claim 6, wherein each said lateral arm further comprises:
   said rod being threaded; and
   a stop threadedly engaged to said rod wherein said stop is adjustably positionable on said rod, said biasing member being compressed between a lip positioned within said sleeve and said stop wherein tension in said biasing member is adjustable by adjusting a position of said stop on said rod.

8. A vehicle dumping bed cleaning device comprising:
a vehicle having a dumping bed, said dumping bed having a pair of walls, said walls being spaced apart and parallel, said dumping bed having a bottom surface extending between said walls, said walls and said bottom surface defining an interior space of said dumping bed;
a pair of lateral arms, each of said lateral arms being pivotally coupled to an associated one of said walls of said dumping bed, each of said lateral arms being elongated;
a scraper coupled to and extending between said lateral arms, said scraper being positioned to abut said bottom surface of said dumping bed as said lateral arms are pivoted wherein said scraper is configured for scraping debris from said bottom surface of said dumping bed; and
a motor coupled to said lateral arms wherein said motor urges said lateral arms to pivot whereby said scraper is moved on said bottom surface of said dumping bed; and
wherein said scraper comprises:
a base coupled to and extending between said lateral arms; and
a plurality of blades, each of said blades being coupled to said base, each of said blades extending outwardly from said base wherein a distal edge of each said blade relative to said base abuts said bottom surface of said dumping bed.

9. The device of claim 8, further comprising said blades being linearly aligned along a full length of said base.

10. The device of claim 8, further comprising each said blade abutting each adjacently positioned said blade along said base wherein said blades extend continuously along said base of said scraper.

11. The device of claim 8, further comprising a plurality of connectors, each of said connectors removably coupling an associated one of said blades to said base wherein each of said blades is individually replaceable.

12. The device of claim 1, further comprising said dumping bed being pivotable relative to said vehicle.

13. The device of claim 12, further comprising said dumping bed being pivotable parallel to a longitudinal axis of said vehicle.

14. The device of claim 12, further comprising said dumping bed being pivotable transverse to a longitudinal axis of said vehicle.

15. The device of claim 1, further comprising:
each of said lateral arms being parallel to said associated wall of said dumping bed, each of said lateral arms having a first end pivotally coupled to said associated wall of said dumping bed, each of said lateral arms being compressible relative to a length of said lateral arm, each said lateral arm comprising
a sleeve having an open end,
a rod slidably inserted into said open end of said sleeve, said rod being threaded,
a biasing member coupled to said rod and said sleeve such that said biasing member urges said rod outwardly relative to said open end of said sleeve wherein each said lateral arm is resiliently biased to resist compression, and
a stop threadedly engaged to said rod wherein said stop is adjustably positionable on said rod, said biasing member being compressed between a lip positioned within said sleeve and said stop wherein tension in said biasing member is adjustable by adjusting a position of said stop on said rod;
said scraper being positioned such that said scraper maintains contact with said bottom surface of said dumping bed as said lateral arms are pivoted, said scraper being moved in line with a direction in which said dumping bed is pivoted to dump material from said dumping bed, said scraper comprising a base coupled to and extending between said lateral arms,
a plurality of blades, each of said blades being coupled to said base, each of said blades extending outwardly from said base wherein a distal edge of each said blade relative to said base abuts said bottom surface of said dumping bed, said blades being linearly aligned along a full length of said base, each said blade abutting each adjacently positioned said blade along said base wherein said blades extend continuously along said base of said scraper, and
a plurality of connectors, each of said connectors removably coupling an associated one of said blades to said base wherein each of said blades is individually replaceable; and
said lateral arms being hydraulically coupled to said motor.

16. The device of claim 15, further comprising said dumping bed being pivotable parallel to a longitudinal axis of said vehicle.

17. The device of claim 15, further comprising said dumping bed being pivotable transverse to a longitudinal axis of said vehicle.

* * * * *